United States Patent Office 3,020,118
Patented Feb. 6, 1962

3,020,118
PULSE MODULATION RECORDING FOR
TELEMETERING
Paul E. Smith, Jr., Littleton, Mass., assignor to Conval
Corporation, Cambridge, Mass., a corporation of Massachusetts
Filed May 14, 1959, Ser. No. 813,110
2 Claims. (Cl. 346—74)

The present invention relates in general to data recording systems and more particularly concerns a novel system for accurately presenting a permanent visual display of the magnitude of a quantity transmitted by pulse duration modulation. The apparatus required to achieve this result is greatly simplified because elements function not only for effecting the permanent record, but also for converting the pulse duration into an analogous amplitude.

This application represents a continuation-in-part of the copending application entitled Recorder, Serial Number 750,678, filed July 24, 1958. In that application, a novel recording system is disclosed wherein the recording paper is translated between a fixed and moving electrode, the relative orientation between the two electrodes being related to the magnitude of a quantity being recorded. When a high potential is applied between the two electrodes, the gap therebetween breaks down at a point dependent upon the relative orientation between the electrodes. The resultant electrical arc discharge punctures a hole in the recording paper at a point proportional to the contemporary value of the quantity being recorded. The punctured dots along the moving recording paper then represent the quantity being recorded as a function of time or some other variable related to the displacement of the recording medium.

It is frequently desired to obtain a permanent recording of a remotely telemetered quantity where it is inconvenient or impossible to make direct recordings. For example, this is especially true in connection with measuring conditions in a missile or other aircraft being flight tested. To transfer this data from the flying vehicle to the ground monitoring station, it is customary to convert the quantity into a suitably modulated electrical signal which is transmitted on a high frequency carrier wave to the ground station.

One of the more desirable modulation techniques converts the magnitude of the monitored quantity into a pulse duration. The duration of each transmitted pulse is then proportional to the magnitude of the quantity at discrete sampling intervals generally separated by the time interval between the leading edge of such pulses. The received pulses may be converted into a signal amplitude by integrating each pulse and holding (or clamping) the integrated value until the next pulse is integrated. The resulting signal amplitude may then be used to operate a recording device. However, accurate integration devices and clamping circuits are frequently complex and expensive.

Accordingly, the present invention contemplates and has as an important object the provision of apparatus for directly converting a pulse duration into a recorded signal amplitude.

It is another object of the invention to achieve the foregoing object with reliably operating apparatus relatively free from complexity.

According to the invention, means are provided defining an electrical arc discharge gap along a curve between first and second points. A recording medium, such as paper, passes through the discharge gap, relative movement being effected between gap and medium. At the leading edge of each input pulse, a possible point of arc discharge is established at said first point of said curve and advanced along said curve toward said second point. When the trailing edge of the input pulse is sensed, an arc discharge is effected across the gap at the then possible point of arc discharge to mark the recording medium at a point on said curve spaced from said first point by a distance related to the pulse duration and, accordingly, the quantity represented thereby.

Other features, objects and advantages of the invention will become apparent from the following specification when read in connection with the accompanying drawing in which.

Figures 2, 3:
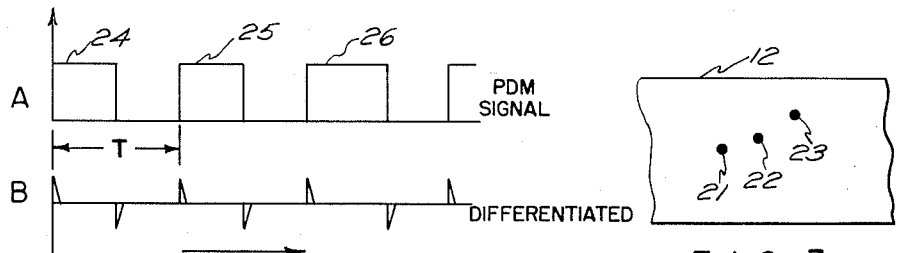
FIG. 2 is a graphical representation of certain signal wave forms as a function of time helpful in understanding the mode of operation.
Figure 4:
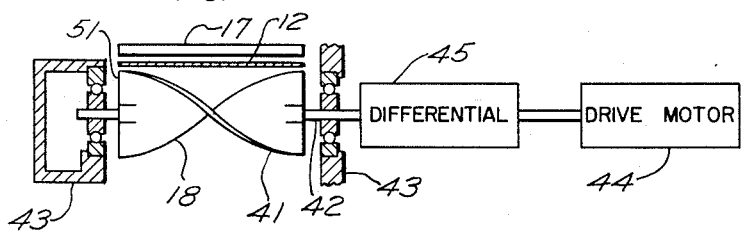

FIG. 3 shows a portion of the recording medium with holes punctured therein at points related to the duration of the pulses shown in FIG. 2a; and FIG. 4 is a combined block-pictorial diagram showing an exemplary embodiment of electrodes, electrode driving means and means for establishing a desired initial relative orientation between the fixed and movable electrodes in synchronism with the leading edge of an information pulse whose duration is modulated.

Figure 1:
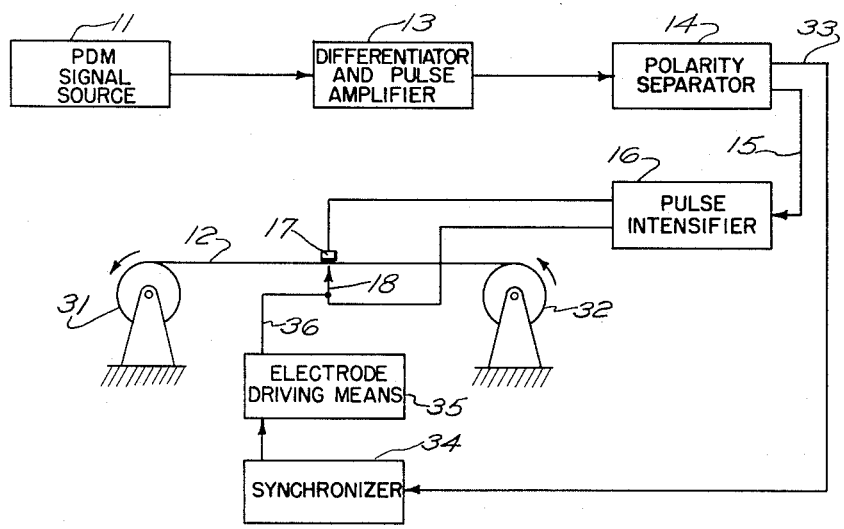
FIG. 1 is a combined block-pictorial diagram generally representing a system arranged according to the invention.

With reference now to the drawing and more partivularly FIG. 1 thereof, there is illustrated a block-pictorial diagram showing a system arranged according to the invention. Pulse duration modulated information delivered by signal source 11 is converted into a permanently recorded amplitude on recording medium 12. FIG. 2a shows a typical pulse duration modulated signal graphically represented as a function of time. This signal is applied to a differentiator and pulse amplifier 13. The output of the differentiator and pulse amplifier 13 is graphically represented in FIG. 2b. At the leading edge, a positive pulse is provided while coincident with the trailing edge of each pulse in FIG. 2a, a negative pulse is provided. Since the leading edge of each information-bearing pulse is separated from those of adjacent pulses by the time interval T, the positive pulses derived therefrom, are spaced by the same regular interval. The distance between a negative pulse and the immediately preceding positive pulse is characteristic of the quantity represented by the pulse duration modulation.

The differentiated pulses are applied to a polarity separator 14. The polarity separator 14 responds to each negative pulse by delivering an output pulse on line 15. Pulse intensifier 16 amplifies this pulse sufficiently to cause electric arc discharge across the gap defined between the fixed electrode 17 and the movable electrode 18. When this discharge occurs, medium 12 is marked to record the quantity as illustrated in FIG. 3 at 21, 22 and 23, corresponding respectively to the durations of pulses 24, 25 and 26 in FIG. 2a.

As shown in FIG. 1, the medium 12 is displaced to the left and moves from reel 32 to take-up reel 31. Alternately it is possible to eliminate the take-up reel, replacing it by a suitably arranged paper translating means.

The polarity separator 14 responds to each positive pulse by delivering an output pulse on line 33. The succession of positive pulses on line 33 are applied to synchronizer 34 to generate an alternating sinusoidal voltage which will be fixed in phase with respect to the positive pulse train. This alternating voltage is applied to the electrode driving means 35, which may be a synchronous motor. This motor drives electrode 18 at substantially constant speed so that a predetermined reference position bears a fixed relationship to each positive pulse in the positive pulse train applied on line 33. This electrode may be a helical electrode as further described below. Since the means for providing a sinusoidal wave form in synchronism with an input pulse train are well-known, further details thereof are not discussed herein.

If the positive pulse train is derived from some master oscillator whose signal is available, this oscillator may be used as a signal source for driving the synchronous motor. Sufficient filtering and amplifying means may be provided following the latter source to supply the power required by the motor without excessive harmonic content to avoid overheating the motor.

A reluctance type or permanent magnet type of synchronous motor is preferred. However, a hysteresis motor with a suitable set of slots in its rotor to provide a definite relationship between rotor position and excitation voltage phase may also be used. A mechanical differential may be utilized to couple the drive motor to the rotatable electrode to provide for varying the zero level of the analog recorded signal.

Referring to FIG. 4, there is shown a combined block-pictorial diagram illustrating one method of providing synchronized operation. The movable electrode 18 is a rotatably mounted helical surface normally arranged so that a point along the edge 41 is very close to the fixed electrode 17, normally mounted directly above helical electrode 18. Details of this type of electrode arrangement are fully described in the aforesaid parent application. For the purposes of describing this invention, it is sufficient to state that the particular point where an arc discharge may occur is dependent upon the angular orientation of the movable electrode 18. The movable electrode 18 is mounted upon a shaft 42 which in turn is rotatably supported by ball bearings in a fixed housing 43, shown in section with portions cut away so as not to obscure the principles of operation of this invention. A continuously rotating synchronous drive motor 44 is arranged to transmit a driving torque to the shaft 42 through the differential 45.

The operation of the system is as follows. The synchronous drive motor 44 receives a voltage derived from the positive pulse train from synchronizer 34 so that the beginning edge 51 of the helical electrode 18 passes beneath the upper electrode 17 at a time corresponding to the occurrence of a positive pulse on line 33. Since the synchronous motor 44 is rotating at a substantially constant speed, the point of closest approach between the helical electrode 18 and the upper electrode 17 moves continuously across the recording medium 12 at a substantially constant velocity. When the negative pulse occurs on line 15 (FIG. 1), the point of closest approach has moved a distance proportional to the time interval separating this negative pulse from the preceding positive pulse on line 33. This interval, of course, depends upon the magnitude of the analog voltage modulating the pulse duration, as explained above. At the instant of the occurrence of the negative pulse, the pulse intensifier 16 pulses the electrode pair, causing the production of a visible mark at a spot. The transverse distance between this spot and the edge of the recording medium is proportional to the magnitude of the analog voltage at the time of modulation. In such manner, the value of the analog voltage is converted to a proportional displacement of the recorded mark on the recording medium. Hence, there is produced a visible record of the excursions of the modulating analog voltage. Since the synchronous motor runs at substantially constant speed and the spark itself is virtually inertialess, there is no need to accelerate the inertia of any moving parts, thereby avoiding any time lags or delays.

The system described herein thus directly and almost instantaneously converts a pulse duration modulated signal into a permanently recorded amplitude. In a typical system, the time interval between the trailing edge of a duration modulated pulse and the actual recording of a mark may be of the order of 2 to 5 microseconds. In a typical system, the sampling rate is 400 c.p.s. so that this time interval is but 1/25 of 1% of a cycle.

By utilizing recording system components to effect the conversion from a time duration to a permanently recorded signal amplitude, the required number of elements is reduced to improve reliability. Moreover, sources of inaccuracy present in systems which convert from PDM signals to analog voltages are eliminated; namely, the integrators, the clamping circuits, and the inaccuracy of the analog recorder itself. Furthermore, problems associated with changing the momentum of mechanical components are virtually eliminated so that the recording is fast as well as accurate.

The specific apparatus and techniques described herein are by way of example only. It is evident that those skilled in the art may now make numerous modifications of and departures from the specific systems without departing from the inventive concepts. Consequently, the invention is to be construed as limited only by the spirit and scope of the appended claims.

What is claimed is:

1. Apparatus for permanently recording upon a recording medium the magnitude of a quantity transmitted by pulse duration modulation comprising, a source of duration modulated rectangular pulses, means for differentiating each of said duration modulated pulses to obtain one train of pulses of one polarity coincident with the leading edge of each of said duration modulated pulses and another train of pulses of opposite polarity each coinciding with a duration modulated pulse trailing edge, marking means, means for imparting relative movement between said marking means and said recording medium in first and second different directions, means responsive to said one train of pulses for synchronizing the relative movement in said first direction with the occurrence of said leading edge pulses, and means responsive to each of said trailing edge pulses for impressing a mark upon said medium at points related to the magnitude of said quantity as a function of a variable related to the relative movement in said second direction.

2. Apparatus in accordance with claim 1 wherein said marking means comprises means defining a movable spark gap, and said means responsive to each of said trailing edge signals comprises, a pulse intensifier for raising the energy level of each of said trailing edge pulses, and means for applying the high energy level pulses from the latter intensifier across said spark gap to mark said recording medium.

References Cited in the file of this patent
UNITED STATES PATENTS

| Number | Name | Date |
| --- | --- | --- |
| 2,500,746 | Ellenberger | Mar. 14, 1950 |
| 2,566,240 | Keinath et al. | Sept. 4, 1951 |
| 2,635,032 | Shea | Apr. 14, 1953 |
| 2,759,783 | Ross | Aug. 21, 1956 |
| 2,775,756 | Bracey et al. | Dec. 25, 1956 |
| 2,948,879 | Padberg et al. | Aug. 9, 1960 |

FOREIGN PATENTS

| Number | Country | Date |
| --- | --- | --- |
| 745,643 | Great Britain | Feb. 29, 1956 |